US009313473B2

(12) United States Patent
Yang et al.

(10) Patent No.: US 9,313,473 B2
(45) Date of Patent: Apr. 12, 2016

(54) DEPTH VIDEO FILTERING METHOD AND APPARATUS

(71) Applicants: Electronics and Telecommunications Research Institute, Daejeon (KR); Gwangju Institute of Science and Technology, Gwangju (KR)

(72) Inventors: Seung Jun Yang, Daejeon-si (KR); Ji Hun Cha, Daejeon-si (KR); Jin Woong Kim, Daejeon-si (KR); Sang Beom Lee, Gwangju (KR); Yo Sung Ho, Gwangju (KR)

(73) Assignees: Gwangju Institute of Science and Technology, Gwangju (KR); Electronics and Telecommunications Research Institute, Daejeon (KR)

( * ) Notice: Subject to any disclaimer, the term of this patent is extended or adjusted under 35 U.S.C. 154(b) by 700 days.

(21) Appl. No.: 13/660,953

(22) Filed: Oct. 25, 2012

(65) Prior Publication Data

US 2013/0242043 A1 Sep. 19, 2013

(30) Foreign Application Priority Data

Mar. 19, 2012 (KR) .......................... 10-2012-0027509

(51) Int. Cl.
*H04N 13/00* (2006.01)
*G06T 5/00* (2006.01)
(Continued)

(52) U.S. Cl.
CPC ............ *H04N 13/0014* (2013.01); *G06T 5/002* (2013.01); *G06T 5/20* (2013.01);
(Continued)

(58) Field of Classification Search
CPC .................. H04N 2013/0081; H04N 13/0037; H04N 13/0014; H04N 5/2226; H04N 13/0018; H04N 13/0022; H04N 13/0271; H04N 2213/003; G06T 5/002; G06T 5/50; G06T 2200/04; G06T 2207/20028; G06T 2207/10024; G06T 5/20; G06T 2207/10021; G06T 2207/10028; G06T 2207/20182; G06T 7/0051; G06T 7/0075
See application file for complete search history.

(56) References Cited

U.S. PATENT DOCUMENTS

| 2004/0109585 | A1 | 6/2004 | Tao et al. | |
|---|---|---|---|---|
| 2010/0080448 | A1* | 4/2010 | Tam et al. | 382/154 |
| 2010/0194856 | A1* | 8/2010 | Varekamp | H04N 13/0022 348/42 |
| 2011/0298898 | A1* | 12/2011 | Jung et al. | 348/47 |

(Continued)

FOREIGN PATENT DOCUMENTS

| KR | 1020100050838 A | 5/2010 |
|---|---|---|
| KR | 1020110122817 A | 11/2011 |

OTHER PUBLICATIONS

Sang-Beom Lee, Seung-Jun Yang, Yo-Sung Ho, "Eye Gaze Correction for Teleconferencing Using Depth Video Filtering", 2012, pp. 1-2, Gwangju Institute of Science and Technology, Electronics and Telecommunications Research Institute.

(Continued)

*Primary Examiner* — Sath V Perungavoor
*Assistant Examiner* — Xiaolan Xu
(74) *Attorney, Agent, or Firm* — William Park & Associates Ltd.

(57) ABSTRACT

An image synthesizing method according to the present invention includes generating a depth image in a current picture by searching depth information using a plurality of color images obtained at different view points, performing filtering on the depth image using a 3-dimensional (3D) joint bilateral filter, and generating a synthesized image using the plurality of color images and the filtered depth image, wherein the 3D joint bilateral filter performs filtering on the generated depth image using color image information for at least one of previous pictures, the current picture, and subsequent pictures, and the color image information includes information on a boundary of an object in the color images and color information of the color images. According to the present invention, image processing performance may be enhanced.

9 Claims, 2 Drawing Sheets

(51) Int. Cl.
*G06T 5/20* (2006.01)
*G06T 5/50* (2006.01)

(52) U.S. Cl.
CPC .............. *G06T 5/50* (2013.01); *H04N 13/0037* (2013.01); *G06T 2200/04* (2013.01); *G06T 2207/10021* (2013.01); *G06T 2207/10024* (2013.01); *G06T 2207/10028* (2013.01); *G06T 2207/20028* (2013.01); *G06T 2207/20182* (2013.01); *H04N 2013/0081* (2013.01)

(56) References Cited

U.S. PATENT DOCUMENTS

2012/0194642 A1\* 8/2012 Lie et al. ................... 348/43

OTHER PUBLICATIONS

Qingxiong Yang et al., "A Constant-Space Belief Propagation Algorithm for Stereo Matching," IEEE International Conference on Computer Vision and Pattern Recognition, Jun. 2010, p. 1458-1465.

\* cited by examiner

DEPTH VIDEO FILTERING METHOD AND APPARATUS

CROSS-REFERENCE TO RELATED APPLICATION

This application claims priority to Korean Patent Application No. 10-2012-0027509 filed on Mar. 19, 2012, the contents of which are herein incorporated by reference in its entirety.

TECHNICAL FIELD

The present invention is directed to image processing, and more specifically to a depth video filtering method and apparatus.

DISCUSSION OF THE RELATED ART

In multi-dimensional video systems, natural image synthesizing technologies are necessary elements for providing an image at an arbitrary view point. For this, it is inevitable to exactly search depth information.

However, existing depth information searching technologies may cause problems, such as occurrence of errors in depth values, discrepancies in boundary between depth images and color images and a deterioration of temporal correlation. Thus, a need exists for a depth video filtering method able to solve the above-mentioned problems.

SUMMARY

An object of the present invention is to provide a depth video filtering method that may enhance image processing performance.

An object of the present invention is to provide an image synthesizing method that can enhance image processing performance.

An object of the present invention is to provide a multi-dimensional video system that can enhance image processing efficiency.

An embodiment of the present invention is an image synthesizing method. The method includes generating a depth image in a current picture by searching depth information using a plurality of color images obtained at different view points, performing filtering on the depth image using a 3-dimensional (3D) joint bilateral filter, and generating a synthesized image using the plurality of color images and the filtered depth image, wherein the 3D joint bilateral filter performs filtering on the generated depth image using color image information for at least one of previous pictures, the current picture, and subsequent pictures, and the color image information includes information on a boundary of an object in the color images and color information of the color images.

The image synthesizing method may further include storing the plurality of color images and the generated depth image in an image buffer, wherein said performing filtering may include performing filtering using the depth image and the color images stored in the image buffer.

Performing filtering may include performing filtering using only color image information of the pictures other than pictures in each of which a difference value between a pixel value at an arbitrary position in the current picture and an identically positioned pixel value is a threshold value or more, wherein the identically positioned pixel value may be a pixel value at spatially the same position as the arbitrary position in each of at least one of the previous pictures and the subsequent pictures.

Performing filtering may include performing filtering using only color image information of the pictures other than pictures in each of which a difference value between a depth value at an arbitrary position in the current picture and an identically positioned depth value is a threshold value or more, wherein the identically positioned depth value may be a depth value at spatially the same position as the arbitrary position in each of at least one of the previous pictures and the subsequent pictures.

Another embodiment of the present invention is a depth video filtering method. The method includes generating a depth image in a current picture by searching depth information using a plurality of color images obtained at different view points and performing filtering on the depth image using a 3-dimensional (3D) joint bilateral filter, wherein the 3D joint bilateral filter performs filtering on the generated depth image using color image information for at least one of previous pictures, the current picture, and subsequent pictures, and the color image information includes information on a boundary of an object in the color images and color information of the color images.

The depth video filtering method may further include storing the plurality of color images and the generated depth image in an image buffer, wherein performing filtering may include performing filtering using the depth image and the color images stored in the image buffer.

Performing filtering may include performing filtering using only color image information of the pictures other than pictures in each of which a difference value between a pixel value at an arbitrary position in the current picture and an identically positioned pixel value is a threshold value or more, wherein the identically positioned pixel value may be a pixel value at spatially the same position as the arbitrary position in each of at least one of the previous pictures and the subsequent pictures.

Performing filtering may include performing filtering using only color image information of the pictures other than pictures in each of which a difference value between a depth value at an arbitrary position in the current picture and an identically positioned depth value is a threshold value or more, wherein the identically positioned depth value may be a depth value at spatially the same position as the arbitrary position in each of at least one of the previous pictures and the subsequent pictures.

Still another embodiment of the present invention is a multi-dimensional video system. The system includes a depth information searching unit that generates a depth image in a current picture by searching depth information using a plurality of color images obtained at different view points, a filter unit that performs filtering on the depth image using a 3-dimensional (3D) joint bilateral filter, and an image synthesizing unit that generates a synthesized image using the plurality of color images and the filtered depth image, wherein the 3D joint bilateral filter performs filtering on the generated depth image using color image information for at least one of previous pictures, the current picture, and subsequent pictures, and the color image information includes information on a boundary of an object in the color images and color information of the color images.

The multi-dimensional video system may further include an image buffer that stores the plurality of color images and the generated depth image, wherein the filter unit may perform filtering using the depth image and the color images stored in the image buffer.

The filter unit may perform filtering using only color image information of the pictures other than pictures in each of which a difference value between a pixel value at an arbitrary position in the current picture and an identically positioned pixel value is a threshold value or more, wherein the identically positioned pixel value may be a pixel value at spatially the same position as the arbitrary position in each of at least one of the previous pictures and the subsequent pictures.

The filter unit may perform filtering using only color image information of the pictures other than pictures in each of which a difference value between a depth value at an arbitrary position in the current picture and an identically positioned depth value is a threshold value or more, wherein the identically positioned depth value may be a depth value at spatially the same position as the arbitrary position in each of at least one of the previous pictures and the subsequent pictures.

A depth video filtering method according to an embodiment of the present invention may enhance image processing performance.

An image synthesizing method according to an embodiment of the present invention can enhance image processing performance.

A multi-dimensional video system according to an embodiment of the present invention can enhance image processing efficiency.

DESCRIPTION OF THE EMBODIMENTS

Hereinafter, embodiments of the present invention will be described in detail with reference to the drawings. In describing the embodiments of the invention, when determined to make the gist of the invention unclear, the specific description of the relevant known configuration or functions will be omitted.

When an element is "connected to" or "coupled to" another element, the element may be directly connected or coupled to the other element, but other elements may also be present therebetween. Further, "including" a specific configuration does not exclude other configurations, and rather an additional configuration may be included in the embodiments or the scope of the invention.

The terms, such as "first" and "second", may be used to describe various components, but the components should not be limited to the terms. The terms are used only to distinguish one element from another. For example, a first component may be named a second component without departing from the scope of the invention, and similarly, the second component may be also named the first component.

The components in the embodiments of the invention are independently illustrated to represent different features from each other, and it does not mean that each component is not composed of separate hardware or one software component unit. That is, the components are separated from each other for convenience of description, and at least two components may be combined into a single component or one component may be split into plural components which then may perform respective functions. The combined or split components are also included in the scope of the invention without departing from the gist of the invention.

Further, some components are not inevitable components that perform essential functions of the invention but may be optional components for merely enhancing performance. The present invention may be implemented as including only the components necessary for implementing the gist of the invention except for components used for merely enhancing performance, and any configuration including only the necessary components except for the optional components used for merely enhancing performance is also included in the scope of the invention.

Figure 1:
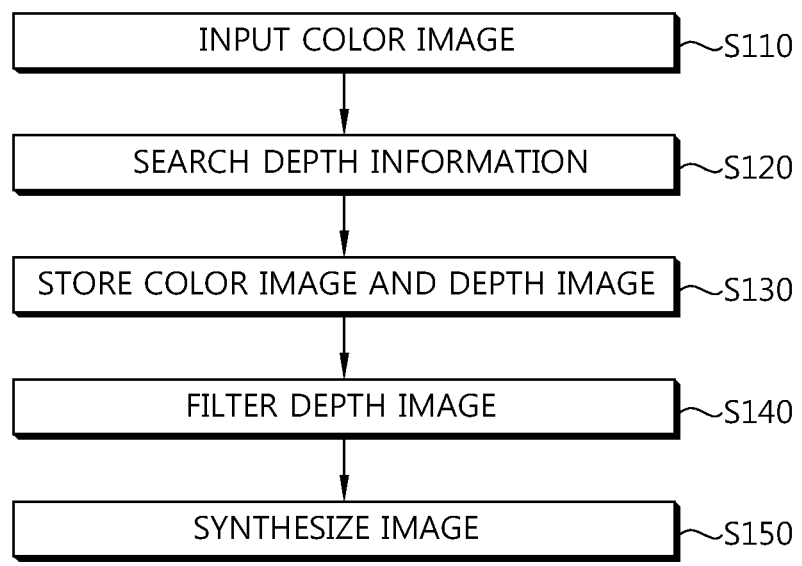
FIG. 1 is a flowchart schematically illustrating an image synthesizing method in a multi-dimensional video system according to an embodiment of the present invention.

FIG. 1 is a flowchart schematically illustrating an image synthesizing method in a multi-dimensional video system according to an embodiment of the present invention.

Unlike the conventional color images which are standard targets for video compression, depth images may include information on distances between a camera and objects on the screen, i.e., depth information (e.g., depth values). In case of a multi-dimensional video, a stereoscopic feeling or multi-dimensional information may be represented by depth information. For example, 3D videos that provide stereoscopic feelings may include binocular-type 3D videos and multi-view 3D videos.

Multi-dimensional video systems require an image synthesizing technology using depth images and color images of plural view points so as to provide an image of an arbitrary view point. For natural image synthesizing, a technology to exactly search depth information is inevitable. However, in the course of searching depth information, pixels present together in color images of plural view points (for example, left view point and right view point) fail to exactly match each other. In such case, an error may occur in depth values of depth images produced while the depth information is searched. Further, such errors in depth values may cause discrepancies in boundaries between the depth images and the color images.

To address the above-described problems while enhancing accuracy of the depth images, the multi-dimensional video system may employ a depth image after-treatment technology using a joint bilateral filter. Here, the joint bilateral filter refers to a filter that performs filtering on the depth images by using boundary information of the color images and color information of the color images. The boundary information of the color images may refer to information that represent boundaries of objects in the color images. The depth image after-treatment technology using the joint bilateral filter may effectively solve the problem of the discrepancies in boundaries between the depth images and the color images.

However, the depth image after-treatment technology cannot address a deterioration of temporal correlation which is a cause of degrading the quality of a synthesized image. Here, the temporal correlation may refer to a correlation between pictures present at different temporal positions. If the temporal correlation decreases, a position where an error occurs may continue to vary while depth information is searched independently for each picture. Accordingly, the deterioration of the temporal correlation may cause the object boundary of a synthesized image to shake or background portion to flicker.

To address the problem of the deterioration of the temporal correlation, the multi-dimensional video system may perform motion prediction during the course of searching the depth information. That is, an encoder may enhance temporal correlation by referring to depth values of a previous picture and/or a subsequent picture. Here, the previous picture refers to a picture that represents a past time earlier than a time of a current picture, in terms of time, and the subsequent picture refers to a picture that represents a future time later than the time of the current picture in terms of time. However, the above-described motion prediction method requires a considerable time of calculation, and a result of the motion prediction may highly rely on the performance of the motion prediction.

Accordingly, there may be provided an image synthesizing method that may prevent the temporal correlation from deteriorating, thus minimizing a flicker that occurs in an object boundary region of the synthesized image.

Referring to FIG. 1, the multi-dimensional video system may receive plural color images obtained at different view points (S110). Hereinafter, the color images of plural view points, that is, the plural color images obtained at different view points, are collectively referred to as stereo color images, and for ease of description, the stereo color images may be also called color images.

The color images of the plural view points, respectively, may be obtained by different cameras, and thus, for the stereo color images to be processed, processes of obtaining a camera medium variable and calibrating the cameras may be required. Here, after-treatment processes of the stereo color images, such as the processes of obtaining the camera medium variable and calibrating the cameras, are assumed to have been done.

If the stereo color images are input, the multi-dimensional video system may search depth information for the stereo color images by using the stereo color images (S120). At this time, the multi-dimensional video system may use a stereo matching algorithm to search the depth information. By searching the depth information, the multi-dimensional video system may produce depth images for the stereo color images.

The multi-dimensional video system may store the color images and the depth images produced in step S120 in an image buffer (S130). As will be described later, the multi-dimensional video system according to an embodiment of the present invention may perform filtering of the depth images by using a joint bilateral filter that has expanded along a time axis. That is, the multi-dimensional video system may use information included in the previous picture and/or subsequent picture when performing filtering on the depth images in the current picture. Accordingly, the multi-dimensional video system may store the depth images and the color images in the image buffer and then may use the images upon filtering.

Referring back to FIG. 1, the multi-dimensional video system may perform filtering on the depth images in the current picture by using the depth images and/or color images stored in the image buffer (S140).

The multi-dimensional video system may use the boundary information and the color information of the color images for depth video filtering. Here, the boundary information may refer to information that represents a boundary of an object in a color image. As described above, a filter that performs filtering on the depth images by using the color information and the boundary information of the color images may be referred to as a joint bilateral filter. A depth video filtering process by the joint bilateral filter may correspond to an after-treatment process of the depth images.

Further, the multi-dimensional video system may apply a joint bilateral filter expanded along a time axis to the depth images. That is, an applicable range of the joint bilateral filter may expand to the time axis. In such case, when performing filtering on the depth images in the current picture, the multi-dimensional video system may use information included in the previous picture and/or subsequent picture as well as information included in the current picture. The information included in the previous picture and/or subsequent picture may include the boundary information of the color images, color information of the color images, and/or depth image information.

When the joint bilateral filter expanded along the time axis is used, the multi-dimensional video system may apply filtering not only along a spatial axis but also along the time axis in the current picture. Accordingly, the joint bilateral filter expanded along the time axis may also be referred to as a three-dimensional (3D) bilateral filter. That is, in the present invention, an applicable range of filtering may expand to 3D.

When the 3D bilateral filter is used, temporal correlation may be enhanced over most of areas in the depth images. However, areas where there is a movement may rather encounter large errors in depth values after filtering. Accordingly, to remove filtering errors in the areas where there is a movement, the multi-dimensional video system may apply a contour error removing technology to filtering. That is, the multi-dimensional video system may use the contour error removing technology to perform filtering on the depth images.

As an example, the multi-dimensional video system may compare a depth value (hereinafter, referred to as a current depth value) at a position (x, y) in the current picture (or current depth image) with an identically positioned depth value. Here, the identically positioned depth value may refer to a depth value that is located spatially at the same position as the position (x, y) in the previous picture and/or subsequent picture. If a gap (hereinafter, referred to as an identically positioned depth value gap) between the current depth value and the identically positioned depth value is equal to or more than a certain threshold value, the picture having the identically positioned depth value may be a picture including a contour error.

Accordingly, when performing filtering on the depth images, the multi-dimensional video system may not use the previous picture or subsequent picture where the identically positioned depth value gap is a certain threshold value or more. That is, the multi-dimensional video system may remove the previous picture or subsequent picture where the identically positioned depth value gap is a certain threshold value or more and then may perform filtering on the depth images by using only the picture where the identically positioned depth value gap is less than the certain threshold value.

Further, the multi-dimensional video system may compare a pixel value (hereinafter, referred to as current pixel value) at an arbitrary position (x, y) in the current picture (or current depth image) with the identically positioned pixel value. Here, the identically positioned pixel value may refer to a pixel value present spatially at the same position as the position (x, y) in the previous picture and/or subsequent picture.

When a gap between the current pixel value and the identically positioned pixel value (hereinafter, referred to as "identically positioned pixel value gap") is a certain threshold value or more, the picture having the identically positioned pixel value may be a picture including a contour error. Accordingly, at this time, when performing filtering on the depth images, the multi-dimensional video system may not use the previous picture or subsequent picture where the identically positioned pixel value gap is the certain threshold value or more. That is, the multi-dimensional video system may remove the picture where the identically positioned pixel value gap is the certain threshold value or more and then may perform filtering on the depth images by using only the picture where the identically positioned pixel value gap is less than the threshold value.

Referring back to FIG. 1, the multi-dimensional video system may generate a synthesized image using the color images and filtered depth images (S150). That is, the multi-dimensional video system may produce the synthesized image by synthesizing the stereo color images using the filtered depth images. At this time, the synthesized image may be an image at an arbitrary view point according to a user's need.

The stereo color images may include color images of plural view points. Among the color images of the plural view points, one may correspond to a reference image, and another may correspond to an auxiliary image. The multi-dimensional video system may fill a predetermined region of the synthesized image using the reference image and may fill another region of the synthesized image using the auxiliary image. Further, regions of the synthesized image which are not filled by the reference image and the auxiliary image may be filled by using a linear interpolation method.

Figure 2:
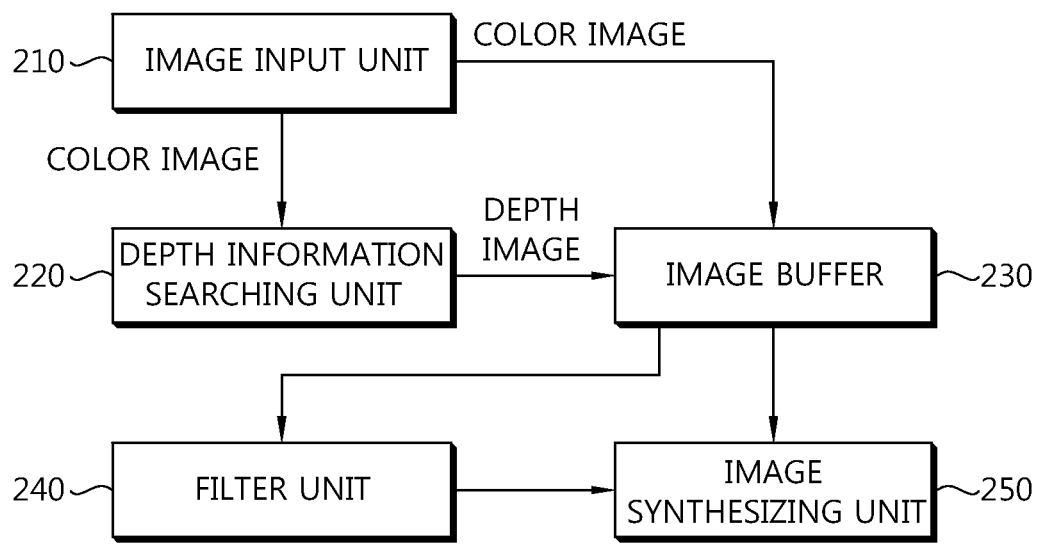
FIG. 2 is a block diagram schematically illustrating a multi-dimensional video system according to an embodiment of the present invention.

FIG. 2 is a block diagram schematically illustrating a multi-dimensional video system according to an embodiment of the present invention. The multi-dimensional video system according to an embodiment of the present invention as shown in FIG. 2 may include an image input unit 210, a depth information searching unit 220, an image buffer 230, a filter unit 240, and an image synthesizing unit 250.

Referring to FIG. 2, the image input unit 210 may input plural color images (stereo color images) obtained at plural different view points to the depth information searching unit 220 and the image buffer 230. Since the color images of the plural view points, respectively, may be obtained by different cameras, for the stereo color images to be processed, processes of obtaining a camera medium variable and calibrating the cameras may be required. Here, after-treatment processes of the stereo color images, such as the processes of obtaining the camera medium variable and calibrating the cameras, are assumed to have been done.

The depth information searching unit 220 may search depth information for the stereo color images using the received stereo color images. At this time, the depth information searching unit 220 may use a stereo matching algorithm for searching the depth information. The depth information searching unit 220 may produce depth images for the stereo color images by searching the depth information.

The image buffer 230 may store the depth images and color images produced by the depth information searching unit 220. As will be described later, the filter unit 240 may perform filtering on the depth images using a joint bilateral filter expanded along a time axis. That is, the filter unit 240 may use information included in the previous picture and/or subsequent picture when performing filtering on the depth images in the current picture. Accordingly, the multi-dimensional video system may store the depth images and color images and then use the stored images in the course of filtering.

Referring back to FIG. 2, the filter unit 240 may perform filtering on the depth images in the current picture using the depth images and/or color images stored in the image buffer. The filtered depth images may be input to the image synthesizing unit 250.

The filter unit 240 may use the boundary information and color information of the color images for depth video filtering. Here, the boundary information may refer to information that represent a boundary of an object in the color image. As described above, a filter that performs filtering on the depth images using the boundary information and color information of the color images may be referred to as a joint bilateral filter. The depth video filtering process by the joint bilateral filter may correspond to an after-treatment process of the depth images.

Further, the filter unit 240 may apply the joint bilateral filter expanded along a time axis to the depth images. That is, the applicable range of the joint bilateral filter may expanded along the time axis. In such case, the filter unit 240 may use information included in the previous picture and/or subsequent picture, as well as information included in the current frame when performing filtering on the depth images in the current frame. The information included in the previous picture and/or subsequent picture may include the boundary information of the color images, the color information of the color images, and/or the depth image information.

In the case that the joint bilateral filter expanded along the time axis is used, the filter unit 240 may apply filtering not only along the time axis but also along a spatial axis in the current picture. Accordingly, the joint bilateral filter expanded along the time axis may be called a 3D bilateral filter as well. That is, the applicable range of the filtering may expand to 3D in the present invention.

When the 3D bilateral filter is used, temporal correlation may be enhanced over most of areas in the depth images. However, areas where there is a movement may rather encounter large errors in depth values after filtering. Accordingly, to remove filtering errors in the areas where there is a movement, the filter unit 240 may apply a contour error removing technology to filtering. That is, the filter unit 240 may use the contour error removing technology to perform filtering on the depth images. A specific embodiment of the contour error removing technology has been described above, and thus, the description will be omitted.

Referring back to FIG. 2, the image synthesizing unit 250 may generate a synthesized image using the color images and filtered depth images.

The color images may be input from the image input unit 210 or the image buffer 230. Further, the filtered depth images may be input from the filter unit 240. If the color images and the filtered depth images are input, the image synthesizing unit 250 may generate the synthesized image by synthesizing the stereo color images using the filtered depth images. Here, the synthesized image may be an image at an arbitrary view point according to a users need. A specific embodiment of a method of generating the synthesized image has been described above, and the description will be omitted.

According to the present invention, since upon image synthesis, accuracy and temporal correlation of the image may increase, a natural synthesized image may be generated. Accordingly, it may be possible to solve problems, such as discrepancies in object boundaries between the color images and the depth images, object boundary shaking, and flickering of the background portion, which may occur when the multi-dimensional video system performs image synthesis. Further, according to the present invention, a user's visual fatigue may be reduced.

Although the above embodiments have been described based on a series of steps or blocks or flowcharts, the present invention is not limited to the order of the steps, and rather some steps may occur concurrently with or in a different order from other steps. Further, it will be understood by those skilled in the art that some steps in the flowchart may be non-exclusively included in other steps, or one or more steps in the flowchart may be omitted without affecting the scope of the invention.

The above-described embodiments include various aspects of examples. Although it is not possible to describe all possible combinations to represent various aspects, it will be understood by those skilled in the art that other combinations may be available. Accordingly, the present invention is intended to include all other modifications, alterations, and variations that belong to the appended claims.

What is claimed is:

1. An image synthesizing method comprising:
generating a depth image in a current picture by searching depth information using a plurality of color images obtained at different view points;
performing filtering on the depth image using a 3-dimensional (3D) joint bilateral filter; and
generating a synthesized image using the plurality of color images and the filtered depth image,
wherein the 3D joint bilateral filter performs filtering on the generated depth image using color image information for the current picture and at least one of a previous picture and a subsequent picture, and the color image information includes information on a boundary of an object in the color images and color information of the color images,
wherein said performing filtering includes performing filtering using only color image information of the pictures other than pictures in each of which a difference value between a pixel value at an arbitrary position in the current picture and an identically positioned pixel value is a threshold value or more, wherein the identically positioned pixel value is a pixel value at spatially the same position as the arbitrary position in each of at least one of the previous pictures and the subsequent pictures.

2. An image synthesizing method comprising:
generating a depth image in a current picture by searching depth information using a plurality of color images obtained at different view points;
performing filtering on the depth image using a 3-dimensional (3D) joint bilateral filter; and
generating a synthesized image using the plurality of color images and the filtered depth image,
wherein the 3D joint bilateral filter performs filtering on the generated depth image using color image information for the current picture and at least one of a previous picture and a subsequent picture, and the color image information includes information on a boundary of an object in the color images and color information of the color images,
wherein said performing filtering includes performing filtering using only color image information of the pictures other than pictures in each of which a difference value between a depth value at an arbitrary position in the current picture and an identically positioned depth value is a threshold value or more, wherein the identically positioned depth value is a depth value at spatially the same position as the arbitrary position in each of at least one of the previous pictures and the subsequent pictures.

3. The image synthesizing method of claim 1 or claim 2, further comprising storing the plurality of color images and the generated depth image in an image buffer, wherein said performing filtering includes performing filtering using the depth image and the color images stored in the image buffer.

4. A depth video filtering method comprising:
generating a depth image in a current picture by searching depth information using a plurality of color images obtained at different view points; and
performing filtering on the depth image using a 3-dimensional (3D) joint bilateral filter,
wherein the 3D joint bilateral filter performs filtering on the generated depth image using color image information for the current picture and at least one of a previous picture and a subsequent picture, and the color image information includes information on a boundary of an object in the color images and color information of the color images,
wherein said performing filtering includes performing filtering using only color image information of the pictures other than pictures in each of which a difference value between a pixel value at an arbitrary position in the current picture and an identically positioned pixel value is a threshold value or more, wherein the identically positioned pixel value is a pixel value at spatially the same position as the arbitrary position in each of at least one of the previous pictures and the subsequent pictures.

5. A depth video filtering method comprising:
generating a depth image in a current picture by searching depth information using a plurality of color images obtained at different view points; and
performing filtering on the depth image using a 3-dimensional (3D) joint bilateral filter,
wherein the 3D joint bilateral filter performs filtering on the generated depth image using color image information for the current picture and at least one of a previous picture and a subsequent picture, and the color image information includes information on a boundary of an object in the color images and color information of the color images,
wherein said performing filtering includes performing filtering using only color image information of the pictures other than pictures in each of which a difference value between a depth value at an arbitrary position in the current picture and an identically positioned depth value is a threshold value or more, wherein the identically positioned depth value is a depth value at spatially the same position as the arbitrary position in each of at least one of the previous pictures and the subsequent pictures.

6. The depth video filtering method of claim 4 or claim 5, further comprising storing the plurality of color images and the generated depth image in an image buffer, wherein said performing filtering includes performing filtering using the depth image and the color images stored in the image buffer.

7. A multi-dimensional video system comprising:
a depth information searching unit that generates a depth image in a current picture by searching depth information using a plurality of color images obtained at different view points;
a filter unit that performs filtering on the depth image using a 3-dimensional (3D) joint bilateral filter; and
an image synthesizing unit that generates a synthesized image using the plurality of color images and the filtered depth image,
wherein the 3D joint bilateral filter performs filtering on the generated depth image using color image information for the current picture and at least one of a previous picture and a subsequent picture, and the color image information includes information on a boundary of an object in the color images and color information of the color images,
wherein the filter unit performs filtering using only color image information of the pictures other than pictures in each of which a difference value between a pixel value at an arbitrary position in the current picture and an identically positioned pixel value is a threshold value or more, wherein the identically positioned pixel value is a pixel value at spatially the same position as the arbitrary position in each of at least one of the previous pictures and the subsequent pictures.

8. A multi-dimensional video system comprising:
- a depth information searching unit that generates a depth image in a current picture by searching depth information using a plurality of color images obtained at different view points;
- a filter unit that performs filtering on the depth image using a 3-dimensional (3D) joint bilateral filter; and
- an image synthesizing unit that generates a synthesized image using the plurality of color images and the filtered depth image,
- wherein the 3D joint bilateral filter performs filtering on the generated depth image using color image information for the current picture and at least one of a previous picture and a subsequent picture, and the color image information includes information on a boundary of an object in the color images and color information of the color images,
- wherein the filter unit performs filtering using only color image information of the pictures other than pictures in each of which a difference value between a depth value at an arbitrary position in the current picture and an identically positioned depth value is a threshold value or more, wherein the identically positioned depth value is a depth value at spatially the same position as the arbitrary position in each of at least one of the previous pictures and the subsequent pictures.

9. The multi-dimensional video system of claim 7 or claim 8, further comprising an image buffer that stores the plurality of color images and the generated depth image, wherein the filter unit performs filtering using the depth image and the color images stored in the image buffer.

\* \* \* \* \*